US010862850B2

(12) United States Patent
Bansal (10) Patent No.: US 10,862,850 B2
(45) Date of Patent: Dec. 8, 2020

(54) NETWORK-ADDRESS-TO-IDENTIFIER TRANSLATION IN VIRTUALIZED COMPUTING ENVIRONMENTS

(71) Applicant: Nicira, Inc., Palo Alto, CA (US)

(72) Inventor: Kaushal Bansal, Pleasanton, CA (US)

(73) Assignee: NICIRA, INC., Palo Alto, CA (US)

( * ) Notice: Subject to any disclaimer, the term of this patent is extended or adjusted under 35 U.S.C. 154(b) by 496 days.

(21) Appl. No.: 15/624,686

(22) Filed: Jun. 15, 2017

(65) Prior Publication Data

US 2018/0367499 A1 Dec. 20, 2018

(51) Int. Cl.
*G06F 15/16* (2006.01)
*H04L 29/12* (2006.01)
*H04L 29/06* (2006.01)
*H04L 12/24* (2006.01)

(52) U.S. Cl.
CPC .............. *H04L 61/15* (2013.01); *H04L 61/25* (2013.01); *H04L 61/30* (2013.01); *H04L 67/42* (2013.01); *H04L 41/12* (2013.01); *H04L 63/0236* (2013.01)

(58) Field of Classification Search
CPC ....................................................... H04L 61/15
See application file for complete search history.

(56) References Cited

U.S. PATENT DOCUMENTS

| 2015/0082417 | A1* | 3/2015 | Bhagwat | H04L 63/0263 |
| | | | | 726/13 |
| 2015/0281060 | A1* | 10/2015 | Xiao | H04L 45/74 |
| | | | | 709/238 |
| 2017/0244673 | A1* | 8/2017 | Han | H04L 63/0263 |
| 2018/0176183 | A1* | 6/2018 | Shah | H04L 63/0254 |
| 2018/0225254 | A1* | 8/2018 | Hu | G06F 9/45558 |

\* cited by examiner

*Primary Examiner* — Kevin T Bates
*Assistant Examiner* — Clarence D McCray
(74) *Attorney, Agent, or Firm* — Su IP Consulting (57) ABSTRACT

Example methods and systems are provided for network-address-to-identifier translation in a virtualized computing environment. The method may comprise: based on traffic flow information associated with a first network address and a second network address, determining that the first network address is associated with a first identifier that identifies the first virtualized computing instance. The method may also comprise: obtaining network topology information specifying how the first virtualized computing instance is connected to the second virtualized computing instance via one or more logical forwarding elements; and based on the network topology information, determining that the second network address is associated with a second identifier that identifies the second virtualized computing instance. The method may further comprise: utilizing the first identifier and the second identifier in a firewall rule to allow or deny a traffic flow between the first virtualized computing instance and the second virtualized computing instance, or to monitor the traffic flow, or both.

21 Claims, 6 Drawing Sheets

NETWORK-ADDRESS-TO-IDENTIFIER TRANSLATION IN VIRTUALIZED COMPUTING ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. Further, through software defined networking, benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. In a virtualized computing environment with hundreds or thousands of virtual machines, it can be very challenging to identify which virtual machine is communicating with which virtual machine, which may in turn result in operational difficulties and/or increased security risks.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
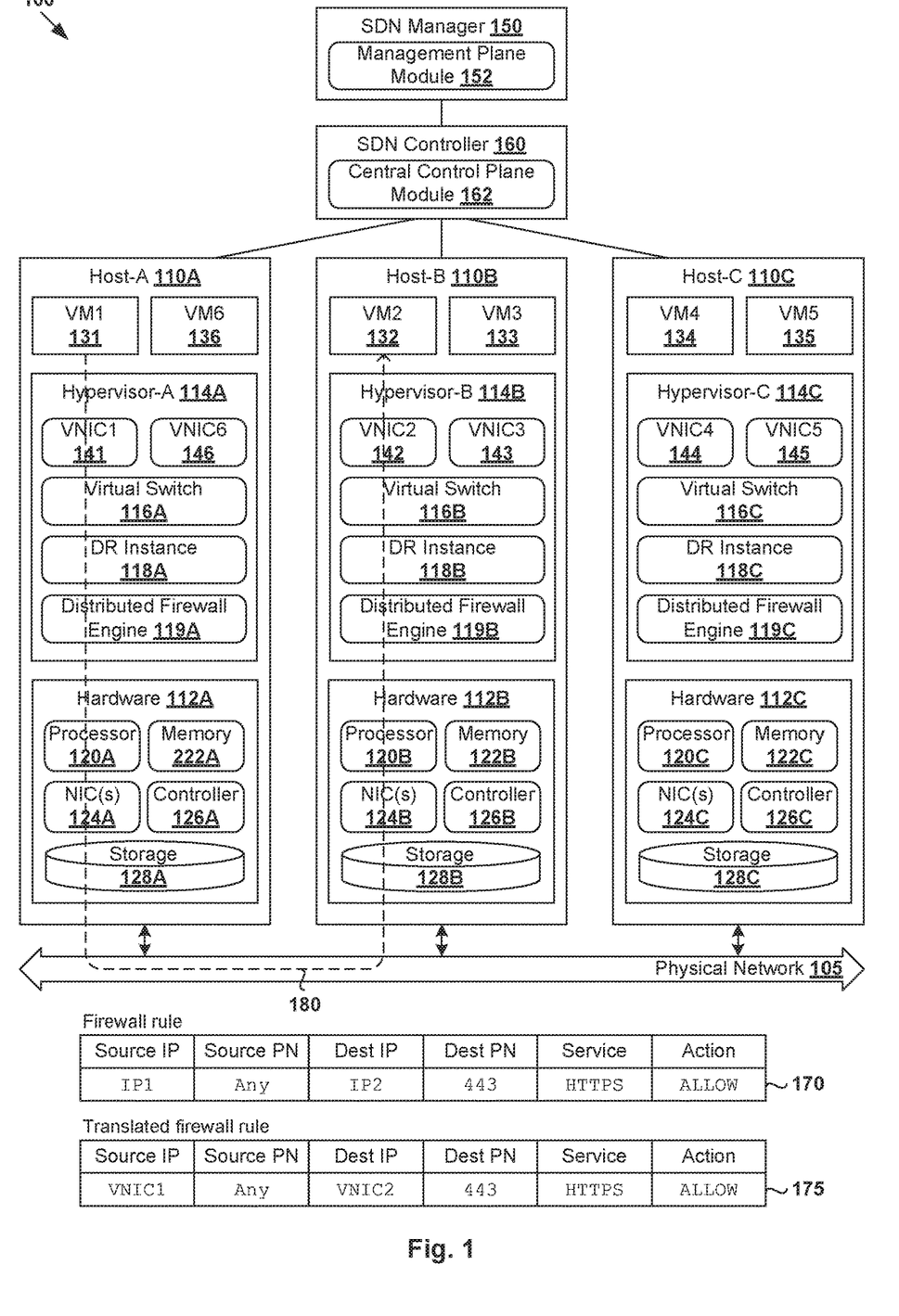
FIG. 1 is a schematic diagram illustrating an example virtualized computing environment in which network-address-to-identifier translation may be performed.

FIG. 1 is a schematic diagram illustrating example virtualized computing environment 100 in which network-address-to-identifier translation may be implemented. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A, host-B 110B and host-C 110C that are connected via physical network 105. Each host 110A/110B/110C includes suitable hardware 112A/112B/112C and virtualization software (e.g., hypervisor-A 114A, hypervisor-B 114B and hypervisor-C 114C) to support virtual machines 131-136. For example, host-A 110A supports VM1 131 and VM6 136; host-B 110B supports VM2 132 and VM3 133; and host-C 110C supports VM4 134 and VM5 135. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines, it should be understood that a "virtual machine" running on host 110A/110B/110C is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. The term "hypervisor" may refer generally to a software layer or component that supports the execution of multiple virtualized computing instances, including system-level software in guest virtual machines that supports namespace containers such as Docker, etc.

Hypervisor 114A/114B/114C maintains a mapping between underlying hardware 112A/112B/112C and virtual resources allocated to respective virtual machines 131-135. Hardware 112A/112B/112C includes suitable physical components, such as central processing unit(s) or processor(s) 120A/120B/120C; memory 122A/122B/122C; physical network interface controllers 124A/124B/124C; and storage disk(s) 128A/128B/128C accessible via storage controller(s) 126A/126B/126C, etc. To support guest operating systems and applications, virtual resources are allocated to the virtual machines. For example, corresponding to hardware 112A/112B/112C, the virtual resources may include virtual CPU, virtual memory, virtual disk, virtual network interface controller (VNIC), etc. In the example in FIG. 1, VM1 131, VM2 132, VM3 133, VM4 134, VM5 135 and VM6 136 are associated with respective VNIC1 141, VNIC2 142, VNIC3 143, VNIC4 144, VNIC5 145 and VNIC6 146. Although one-to-one relationships are shown, one virtual machine may be associated with multiple VNICs (each VNIC having its own network address) in practice.

Hypervisor 114A/114B/114C implements virtual switch 116A/116B/116C and logical distributed router (DR) instance 118A/118B/118C (both to be discussed further below) to forward egress packets (i.e., outgoing or outbound) from, and ingress packets (i.e., incoming or inbound) to, the virtual machines. As used herein, the term "packet" may refer generally to a group of bits that can be transported together from a source to a destination, such as segment, frame, message, datagram, etc. Also, the term "layer 2" may refer generally to a Media Access Control (MAC) layer; and "layer 3" to a network or Internet Protocol (IP) layer in the Open System Interconnection (OSI) model, although the concepts described herein may be used with other networking models. Physical network 105 may include any suitable number of interconnected physical network devices, such as routers, switches, etc.

SDN manager 150 and SDN controller 160 are management entities that facilitate implementation of software defined (e.g., logical overlay) networks in virtualized computing environment 100. Through network virtualization, logical overlay networks may be provisioned, changed, stored, deleted and restored programmatically without having to reconfigure the underlying physical hardware. A logical overlay network may be formed using any suitable protocol, such as Virtual Local Area Network (VLAN), Virtual eXtensible Local Area Network (VXLAN), Stateless Transport Tunneling (STT), Generic Network Virtualization Encapsulation (GENEVE), etc. One example of an SDN controller is the NSX controller component of VMware NSX® (available from VMware, Inc.) that operates on a central control plane. SDN controller 160 may be a member of a controller cluster (not shown for simplicity) that is configurable using SDN manager 150 operating on a management plane. Network management entity 150/160 may be implemented using physical machine(s), virtual machine(s), or both.

To protect virtual machines on each host 110A/110B/110C against security threats caused by unwanted packets, hypervisor 114A/114B/114C implements distributed firewall engine 119A/119B/119C to filter packets to and from associated virtual machines. For example, at host-A 110A, hypervisor 114A implements distributed firewall engine 119A to filter packets for VM1 131 and VM6 136. SDN controller 160 may be used to configure distributed firewall engine 119A/119B/119C to implement firewall rules. Network packets may be filtered according to firewall rules at any point along the datapath from the VM 131-135 to the physical NIC 124A-124C. In one embodiment, a filter component (not shown) is incorporated into each VNIC 141-146 that enforces firewall rules that are associated with the endpoint corresponding to that VNIC and maintained by firewall engine 119A-119C.

For example in FIG. 1, firewall rule 170 may be implemented by distributed firewall engine 119A at host-A 110A to allow a traffic flow between VM1 131 and VM2 132. Firewall rule 170 may be defined using five tuples: source network address, source port number (PN), destination network address, destination PN, and protocol, in addition to an action (e.g., allow or deny). An acceptable value, or range of values, may be specified for each tuple. The protocol tuple (also known as service) may be set to transmission control protocol (TCP), user datagram protocol (UDP), hypertext transfer protocol (HTTP), HTTP Secure (HTTPS), etc.

Conventionally, most physical (i.e., hardware-based) firewall solutions are not aware of the virtual machines they are protecting in a data center. The firewall rules defined for the physical firewall solutions are primarily based on static network addresses (e.g., IP addresses). When these firewall rules are migrated from a physical firewall solution to the distributed firewall solution in virtualized computing environment 100, the firewall rules retain their original definition with the static network addresses.

When the firewall rules are invoked, traffic flow information may be collected by distributed firewall engine 119A/119B/119C (e.g., using a data path module; not shown for simplicity) for various purposes, such as debugging, micro-segmentation planning, auditing, correlation, serviceability, etc. However, it is not intuitive for the user (e.g., network administrator) to identify which virtual machine is communicating with which virtual machine, and which virtual machine is associated with which network address, based on the traffic flow information. This is even more challenging in a multi-tenant data center with hundreds or thousands of virtual machines.

Network-Address-to-Identifier Translation

According to examples of the present disclosure, network addresses may be translated to identifiers identifying a pair of virtual machines based on traffic flow information. In one example, the translation may be used to improve network security, such as by utilizing the identifiers in "object-based" firewall rules for distributed firewall implementation. Additionally or alternatively, the translation may be used to provide operational improvement, such as by utilizing the identifiers for traffic flow monitoring. Various examples will be discussed below.

Figure 2:
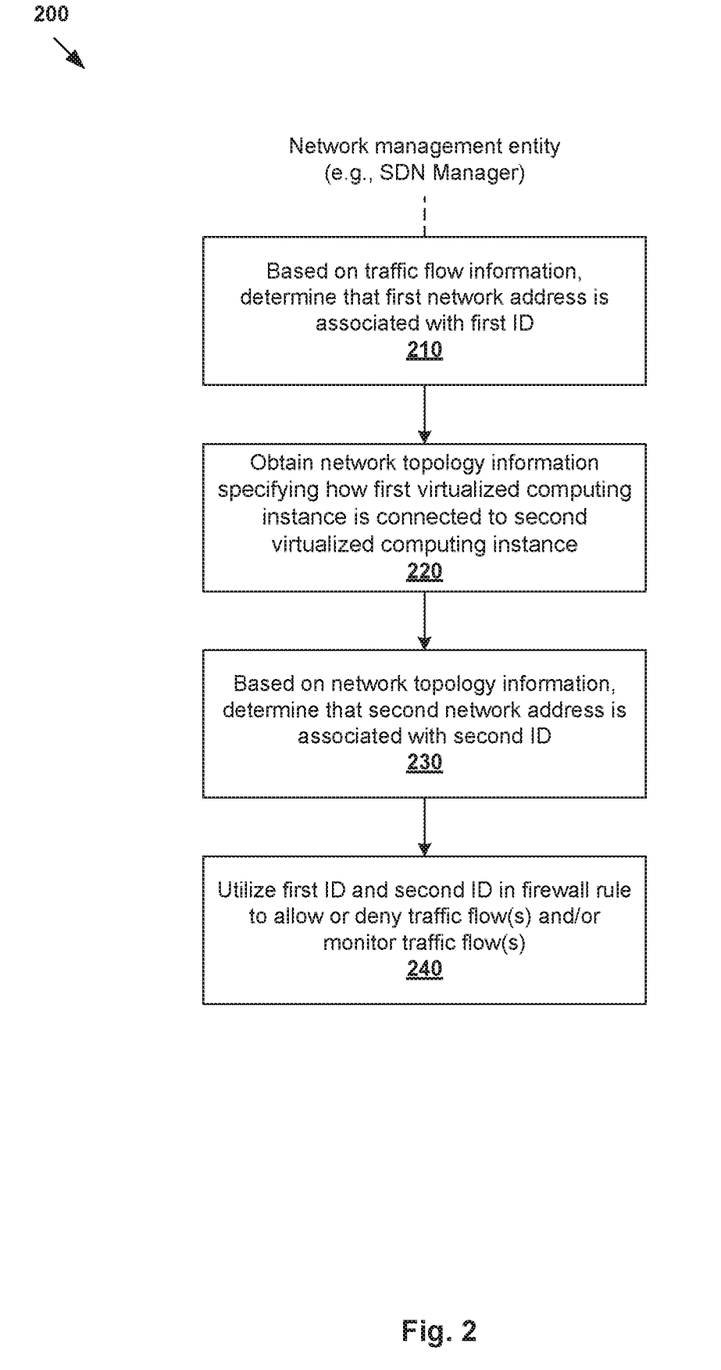
FIG. 2 is a flowchart of an example process to perform network-address-to-identifier translation in a virtualized computing environment.

In more detail, FIG. 2 is a flowchart of example process 200 to perform network-address-to-identifier translation in virtualized computing environment 100. Example process 200 may include one or more operations, functions, or actions illustrated by one or more blocks, such as 210 to 240. The various blocks may be combined into fewer blocks, divided into additional blocks, and/or eliminated depending on the desired implementation.

Throughout the present disclosure, various examples will be described using VM1 131 as an example "first virtualized computing instance," VM2 132, VM4 134 and VM6 as an example "second virtualized computing instance" and VM8 138 (to be introduced below) as an example "third virtualized computing instance." Example process 200 may be implemented by a network management entity, such as SDN manager 150 (e.g., using management plane module 152), SDN controller 160 (e.g., using central control plane module 162), etc.

At 210, based on traffic flow information associated with first network address=IP1 and second network address=IP2 (e.g., specified in firewall rule 170), first network address=IP1 is determined to be associated with a first ID that identifies VM1 131 as described in more detail below with reference to FIGS. 3 and 4. At 220, network topology information specifying how VM1 131 is connected to VM2 132 via logical forwarding element(s) is obtained. At 230, second network address=IP2 is determined to be associated with a second ID that identifies VM2 132. At 240, the first ID and second ID are utilized in a firewall rule to allow or deny a traffic flow between VM1 131 and VM2 132, or to monitor the traffic flow, or both.

For example in FIG. 1, the firewall rule (see translated firewall rule 175) is generated by translating the (first network address=IP1, second network address=IP2) specified in firewall rule 170 to respective (first ID, second ID). In practice, results of the translation from address-based firewall rule 170 to object-based translated firewall rule 175 may be presented to a user for confirmation or selection, such as using any suitable interface provided by SDN manager 150. As will be discussed further using FIG. 6, the first ID and second ID may be utilized in firewall rule(s) to support distributed firewall configuration based on rich objects for security purposes.

Additionally or alternatively, in an operational aspect, the translation may be used for traffic flow monitoring purposes. As used herein, the term "monitor" may refer generally to the monitoring, analysis, visualization or management of traffic flows among virtual machines. In this case, block 240 may include generating a visualization of traffic flows (see 180 in FIG. 1) between VM1 131 and VM2 132 using the first ID and second ID. Traffic flow information associated with (source IP address, destination IP address) may be translated to corresponding (source ID, destination ID) to provide the user with a better visualization and understanding of the east-west traffic flowing between virtual machines within a given data center.

As will be described further using FIGS. 3 and 4, a network address specified in a firewall rule may be mapped to an object identifier in the form of VNIC ID. Unlike a network address (e.g., IP address that might be susceptible to changes), a VNIC ID (also known as a virtual machine ID) is a Universally Unique Identifier (UUID) or a globally unique identifier (GUID) that ensures unambiguous identification of the associated VNIC and virtual machine. The VNIC ID also serves as an identifier of a logical data object representing the associated VNIC and virtual machine on a management plane in virtualized computing instance. Any suitable format may be used for the VNIC ID, such as a 308-bit number with a canonical "8-4-4-4-12" representation.

In one example, the traffic flow information may be collected by host-A 110A (e.g., using distributed firewall engine 119A) in response to invoking firewall rule 170 on packets detected via VNIC1 141 associated with VM1 131 (see also 180 in FIG. 1). In this case, first network address=IP1 may be translated to first ID=VNIC1, which is an ID of VNIC1 141. Further, second network address=IP2 may be translated to second ID=VNIC2, which is an ID of VNIC2 142 associated with VM2 132. The translation may be determined based on network topology information specifying how VM1 131 is connected to VM2 132 via logical forwarding element(s), such as logical switch(es), logical router(s), etc.

Detailed Process

In a flat layer-2 network environment, an IP address may be used to identify a corresponding virtual machine by checking the IP address against inventory information managed by an infrastructure manager (e.g., VMware vCenter®). In a logical overlay network environment (e.g., with multiple tenants that may have overlapping IP address spaces in their respective logical overlay networks), a search may be performed based on network topology information. In the following, various examples will be explained using FIG. 3, which is a schematic diagram illustrating example logical overlay network 300 connecting virtual machines 131-136 in the example in FIG. 1. It should be understood that, depending on the desired implementation, logical overlay network 300 may include additional and/or alternative components than that shown in FIG. 3.

Figure 3:
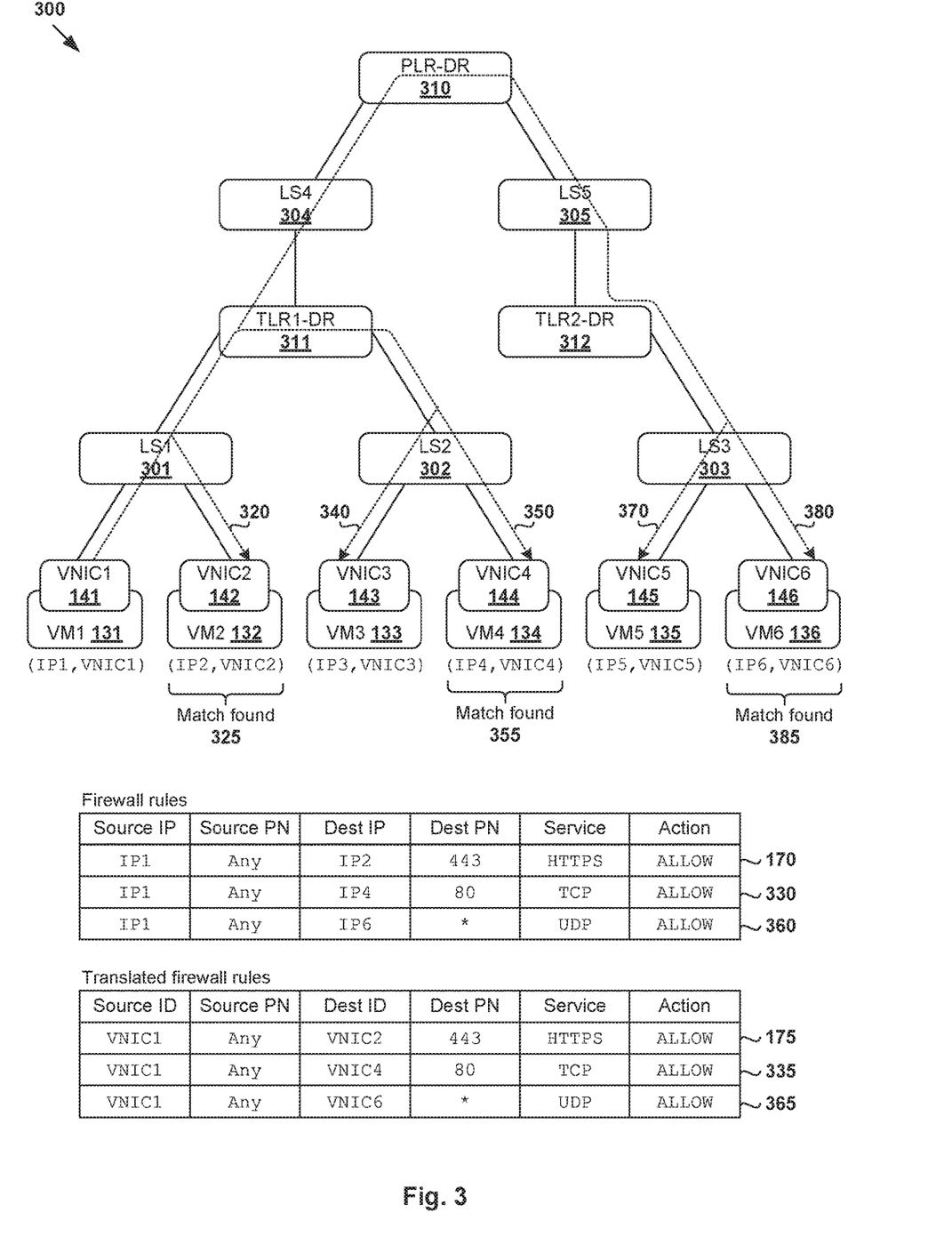
FIG. 3 is a schematic diagram illustrating an example logical overlay network connecting the virtual machines in the example in FIG. 1.

FIG. 3 represents a management plane view that describes how various components are defined internally, while FIG. 1 represents a physical implementation view showing a physical realization of those components. In the example in FIG. 3, virtual machines 131-136 are inter-connected via multiple logical forwarding elements, such as logical routers 310-312, logical switches 301-305, etc. Logical switches 301-303 provide layer-2 switching services to virtual machines 131-136. In particular, LS1 301 provides switching services to VM1 131 and VM2 132, LS2 302 to VM3 133 and VM4 134, and LS3 303 to VM5 135 and VM6 136. LS4 304 and LS5 305 (known as transit logical switches) are configured to handle communications between two logical routers, and not directly connected to any virtual machine.

One example of a logical router is a distributed router (DR) that provides layer-3 routing services for virtual machine(s) and implemented in a distributed manner in that it may span multiple hosts that support the virtual machine(s). Another example is a service router (SR) that provides centralized stateful services to the virtual machine(s), such as firewall protection, load balancing, etc. DR and SR are also known as distributed and centralized routing components, respectively. In a multi-tenant environment, a multi-tier topology may be used to provide isolation for multiple tenants. For example, a two-tier topology includes an upper tier (i.e., tier-0) associated with a provider logical router (PLR) and a lower tier (i.e., tier-1) associated with a tenant logical router (TLR). As such, a logical router may be categorized as one of the following types: TLR-DR, PLR-DR, TLR-SR and PLR-SR.

For simplicity, TLR-DR and PLR-DR will be used as examples throughout the present disclosure. Although not shown in FIG. 3, a PLR-SR may be deployed to connect virtual machines 131-136, to an external network. The multi-tiered topology enables both the provider (e.g., data center owner) and tenant (e.g., data center tenant) to control the services and policies at respective tiers. Each tenant has full control over its TLR policies, whereas common PLR policies may be applied to different tenants. At a lower tier in the example in FIG. 3, TLR1-DR 311 and TLR2-DR 312 may be associated with different tenants. TLR1-DR 311 is connected to LS1 301 and LS2 302, while TLR2-DR 312 is connected to LS3 303. At an upper tier, PLR-DR 310 is connected to TLR1-DR 311 and TLR2-DR 130 via respective LS4 304 and LS5 305.

In practice, logical switches 301-305 and DRs 310-312 are implemented in a distributed manner and can span multiple hosts. For example, logical switches 301-305 may be implemented collectively by virtual switches 116A-C and represented internally using forwarding tables (not shown for simplicity) at each of the virtual switches 116A-C. The forwarding table may include multiple entries that collectively implement respective logical switches 301-305. Logical routers 310-312 may be implemented using a routing table (not shown for simplicity) with multiple entries collectively implementing respective PLR-DR 310, TLR1-DR 311 and TLR2-DR 312. Logical switches, logical routers, logical overlay networks and firewall policies may be configured using SDN manager 150, SDN controller 160, etc.

Figure 4:
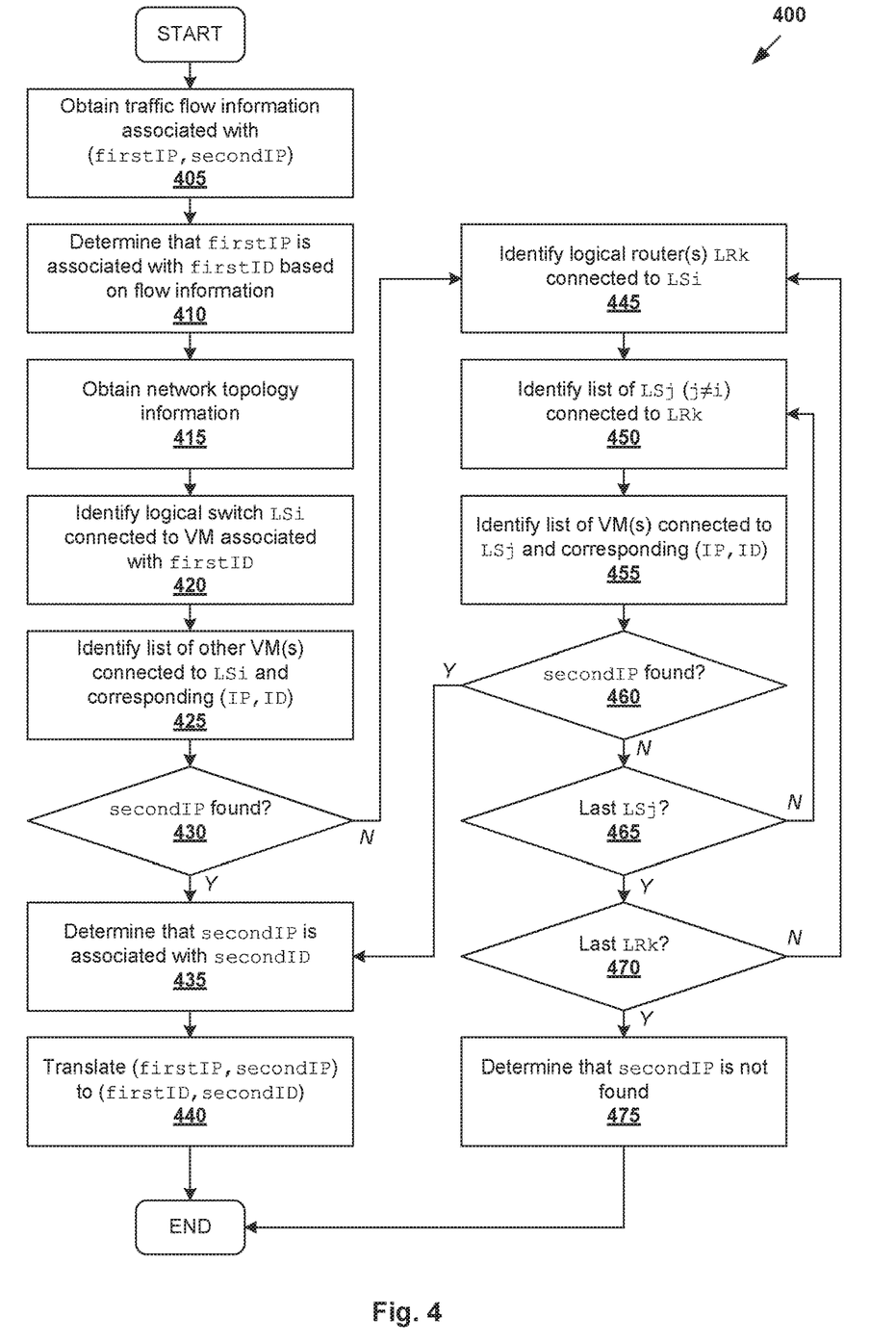
FIG. 4 is a flowchart of an example detailed process to perform network-address-to-identifier translation in a virtualized computing environment.

FIG. 4 is a flowchart of example detailed process 400 to perform network-address-to-identifier translation in a virtualized computing environment. Example process 400 may include one or more operations, functions, or actions illustrated by one or more blocks, such as 405 to 475. The various blocks may be combined into fewer blocks, divided into additional blocks, and/or eliminated depending on the desired implementation. Similar to the example in FIG. 2, example process 400 may be implemented by any suitable network management entity, such as SDN manager 150 (e.g., using management plane module 152), SDN controller 160 (e.g., using central control plane module 162), etc.

Several firewall rule translation examples will be discussed below using firewall rules 170, 330 and 360 in FIG. 3.

(a) Firewall Rule Associated with IP1 and IP2

In a first example, firewall rule 170 (also shown in FIG. 1) may be invoked by distributed firewall engine 119A in response to detecting packets via VNIC1 141 that include header information matching with the following tuples: (source IP address=IP1, source PN=any, destination IP address=IP2, destination PN=443, service=HTTPS). When invoked, distributed firewall engine 119A (e.g., using a datapath module) may be configured to collect traffic flow information associated with the traffic flow (also known as a "firewall flow") between source IP address=IP1 and destination IP address=IP2 specified in firewall rule 170. In this example, IP1 and IP2 may belong to the same subnet.

Turning now to FIG. 4, at block 405, network management entity 150/160 may obtain the traffic flow information associated with source IP address=IP1 and destination IP address=IP2. The term "obtaining" may refer generally to one entity retrieving or receiving information from another, such as SDN manager 150 retrieving or receiving the traffic flow information distributed firewall engine 119A at host-A 110A via SDN controller 160, etc. Since the traffic flow information is collected based on packets detected via VNIC1 141, source ID=VNIC1 (i.e., ID of VNIC1 141) may be determined to be associated with source network address=IP1 according to block 410 in FIG. 4.

VM1 131 with known mapping (IP1, VNIC1) also provides a starting point to search for a target virtual machine associated with destination IP address=IP2. At 415 in FIG. 4, network topology information that specifies how virtual machines 131-136 are connected via logical switches 301-305 and logical routers 310-312 is obtained. The search for the target virtual machine may then be performed in one or more stages, starting from a logical switch connected to VM1 131.

At 420 and 425 in FIG. 4, the network topology information is analyzed to determine that VM1 131 is connected to LS1 301, which in turn connects to VM2 132 associated with (IP2, VNIC2). See 320 and 325 in FIG. 3 showing traversal from VM1 131 to VM2 132 via LS1 301. At 430 in FIG. 4, based on (IP2, VNIC2), it is determined that the target virtual machine with destination IP address=IP2 is found.

At 435 in FIG. 4, based on (IP2, VNIC2), IP2 is determined to be associated with destination ID=VNIC2 (i.e., ID of VNIC2 142) that identifies VM2 132. At 440 in FIG. 4, translated firewall rule 175 is generated from firewall rule 170 by translating (source IP address=IP1, destination IP address=IP2) to (source ID=VNIC1, destination ID=VNIC2).

(b) Firewall Rule Associated with IP1 and IP4

In a second example in FIG. 3, firewall rule 330 may be invoked by distributed firewall engine 119A in response to detecting packets via VNIC1 141 that include header information matching with (source IP address=IP1, source PN=any, destination IP address=IP4, destination PN=80, service=TCP). When invoked, traffic flow information associated with source IP address=IP1 and destination IP address=IP4 may be collected.

Similar to the first example, source network address=IP1 may be determined to be associated with source ID=VNIC1 (i.e., ID of VNIC1 141) based on the traffic flow information according to 405 and 410 in FIG. 4. Starting from VM1 131, a search may be performed to identify the target virtual machine associated with destination IP address=IP4. According to 415 to 430 in FIG. 4, network topology information is analyzed to determine that VM1 131 and the target virtual machine are not connected to the same logical switch=LS1 301.

At 445 in FIG. 4, the search progresses up one level by identifying tier-1 logical router TLR1-DR 311 to which LS1 301 connects. At 450 and 455 in FIG. 4, the network topology information is analyzed to determine that TLR1-DR 311 is connected to another logical switch LS2 302, which is connected to VM3 133 associated with (IP3, VNIC3) and VM4 134 associated with (IP4, VNIC4). See 340 and 350 in FIG. 3 for respective traversals from VM1 131 to VM3 133 and VM4 134 via LS1 301, TLR1-DR 311 and LS2 302. At 460 in FIG. 4, based on (IP4, VNIC4), it is determined that destination IP address=IP4 is found (see also 355 in FIG. 3).

At 435 in FIG. 4, based on (IP4, VNIC4), IP4 is determined to be associated with destination ID=VNIC4 (i.e., ID of VNIC4 144) that identifies VM4 134. At 440 in FIG. 4, translated firewall rule 335 is generated from firewall rule 330 by translating (source IP address=IP1, destination IP address=IP4) to (source ID=VNIC1, destination ID=VNIC4). All other values may remain the same.

(c) Firewall Rule Associated with IP1 and IP6

In a third example in FIG. 3, firewall rule 360 may be invoked by distributed firewall engine 119A in response to detecting packets via VNIC1 141 that include header information matching with (source IP address=IP1, source PN=any, destination IP address=IP6, destination PN=any, service=UDP). Again, when invoked, traffic flow information associated with source IP address=IP1 and destination IP address=IP6 may be collected.

Similar to the first example, source network address=IP1 may be determined to be associated with source ID=VNIC1 (i.e., ID of VNIC1 141) based on the traffic flow information according to 405 and 410 in FIG. 4. According to 415 to 430 in FIG. 4, network topology information is analyzed to determine that VM1 131 and the target virtual machine with destination IP address=IP6 are not connected to the same logical switch=LS1 301.

Similar to the second example, according to 445 to 465 in FIG. 4, the search progresses up one level by identifying tier-1 logical router (i.e., TLR1-DR 311) that is connected to LS1 301. However, it is determined that VM1 131 and the target virtual machine are not connected to TLR1-DR 311, which is instead connected to VM3 133 associated with (IP3, VNIC3) and VM4 134 associated with (IP4, VNIC4).

The search continues to identify another logical router (i.e., PLR-DR 310) that is connected to LS1 301 according to 470 and 445 in FIG. 4. Upper-tier or tier-0 PLR-DR 310 is connected to TLR2-DR 312, which is connected to LS3 303. From LS3 303, VM5 135 associated with (IP5, VNIC5) and VM6 136 associated with (IP6, VNIC6) may be identified. See 370 and 380 in FIG. 3 for respective traversals from VM1 131 to VM5 135 and VM6 136 via LS1 301, TLR1-DR 311, LS4 304, PLR-DR 310, LS5 305, TLR2-DR 312 and LS3 303.

At 460 in FIG. 4, based on (IP6, VNIC6), it is determined that the target virtual machine with destination IP address=IP6 is found (see also 385 in FIG. 3). At 435 in FIG. 4, IP6 is determined to be associated with destination ID=VNIC6 (i.e., ID of VNIC6 146) that identifies VM6 136. At 440 in FIG. 4, translated firewall rule 365 is generated from firewall rule 360 by translating (source IP address=IP1, destination IP address=IP6) to (source ID=VNIC1, destination ID=VNIC6). Otherwise, if no result is found, the translation is not performed according to 475 in FIG. 4.

From an operational perspective, a visualization of the east-west traffic flows explained using FIG. 3 and FIG. 4 may be generated and presented to a user (e.g., network administrator) for traffic flow monitoring purposes. For example, a first visualization of the traffic flow between VM1 131 and VM2 132 may be generated using (source ID=VNIC1, destination ID=VNIC2). A second visualization of the traffic flow between VM1 131 and VM4 134 may be generated using (source ID=VNIC1, destination ID=VNIC4). A third visualization of the traffic flow between VM1 131 and VM6 136 (both on host-A 110A) may be generated using (source ID=VNIC1, destination ID=VNIC6). The visualization(s) may be in the form of the physical implementation view in FIG. 1, or management plane view in FIG. 3, or a combination of both. Attributes associated with the traffic flows may be collected and analyzed for performance analysis and management. As such, the identifiers may be utilized to provide better insight as to which virtual machines that are communicating with each other.

(d) Overlapping Addresses

Figure 5:
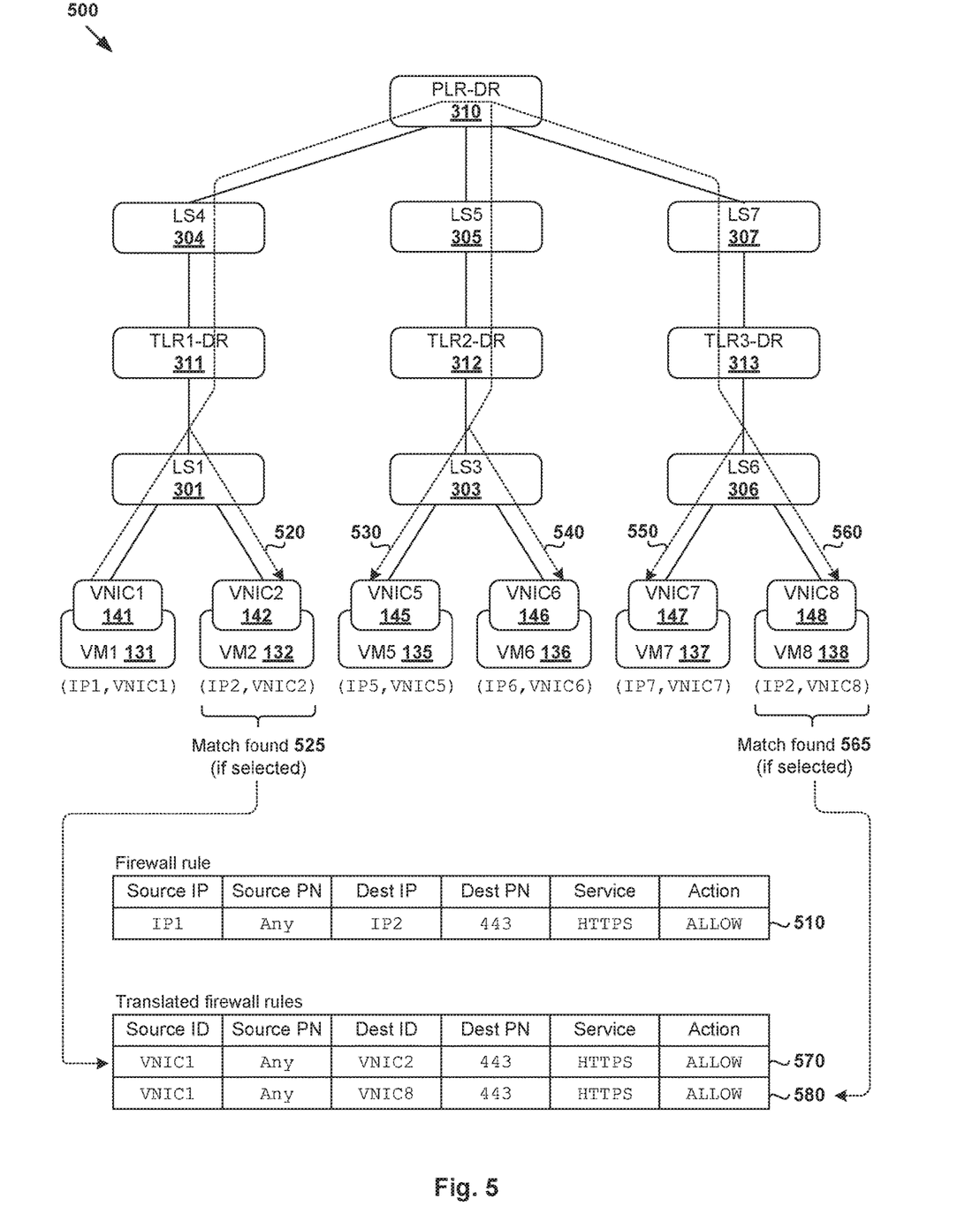
FIG. 5 is a schematic diagram illustrating an example logical overlay network with overlapping network addresses.

In some cases, there may be overlapping IP addresses in a multi-tenant environment. For example, FIG. 5 is a schematic diagram illustrating example logical overlay network 500 with overlapping network addresses. Compared to the example in FIG. 3, three tier-1 logical routers TLR1-DR 311, TLR2-DR 312 and TLR3-DR 313 are deployed to provide isolation for different tenants. Additional virtual machines VM7 137 and VM8 138 are connected to PLR-DR 310 via LS6 306, TLR3-DR 313 and LS7 137. VM2 132 associated with one tenant, and VM8 138 associated with another tenant, share the same IP address=IP2.

In the example in FIG. 5, firewall rule 510 may be invoked by distributed firewall engine 119A in response to detecting packets via VNIC1 141 that include header information matching with the following tuples: (source IP address=IP1, source PN=any, destination IP address=IP2, destination PN=443, service=HTTPS). Again, since (IP1, VNIC1) is known, a search for a target virtual machine associated with IP2 may be performed starting from VM1 131 using example process 400 in FIG. 4.

Similarly, a search may be performed using network topology information that specifies how VM1 131 is connected to other virtual machines via logical forwarding elements. The search is performed in multiple stages according to blocks 415 to 470 in FIG. 4, starting with logical switch LS1 301 connected to VM1 131, before progressing to the logical router level. The traversals from VM1 131 to VM2 132 (see 520 and 525), VM5 135 (see 530), VM6 136 (see 540), VM7 137 (see 550) and VM8 138 (see 560 and 565) are shown in FIG. 5. Based on (IP2, VNIC2) and (IP2, VNIC8), IP2 may be associated with first ID=VNIC2 of VM2 132 and second ID=VNIC8 of VM8 138.

To ensure the authoritativeness of the translation, a manual or automatic approval process may be performed before block 440 in FIG. 4. According to the manual approach, both results may be presented to a user (e.g., network administrator) for selection and approval, such as via an interface provided by SDN manager 150. Based on the user's input that selects the first result (IP2, VNIC2), a translated firewall rule is generated by translating (IP1, IP2) to (VNIC1, VNIC2); see 570 in FIG. 5. Otherwise, if the second result (IP2, VNIC8) is selected by the user, a different translated firewall rule is generated by translating (IP1, IP2) to (VNIC1, VNIC8); see 580 in FIG. 5. According to the automatic approach, the user may also configure one or more selection criteria based on which one result (e.g., first result) is automatically selected and approved (i.e., automated approval).

Alternatively, the above search may be performed according to a "find-first" approach that will only return one result. In this case, the search will stop once the first result (IP2, VNIC2) is found by traversing from VM1 131 to VM2 132 via LS1 301. It is not necessary to continue the traversal from LS1 301 to VM8 138 associated with (IP2, VNIC8). Once a result is found, translated firewall rule may be generated at block 440 in FIG. 4 after the result is approved, such as by a user via SDN manager 150, or automatically according to a Trust on First Use (TOFU) principle.

Depending on the network topology and/or user's preference, the manual approach, automatic approach, find-first approach, or a combination thereof, may be implemented. For example, even when the find-first approach is used, multiple results may be found simultaneously. Depending on the network topology, this may occur in the example in FIG. 5 when a search starts from VM5 135 to translate (IP5, IP2). Since VM2 132 and VM8 138 are the same number of "hops" away from VM5 135, both (VNIC5, VNIC2) and (VNIC5, VNIC8) may be found simultaneously. In this case, the manual approach (i.e., user intervention) or automatic approach (e.g., take the first result if there are multiple choices for TOFU) may be used to select one of the results before a translated firewall rule is generated. As such, in case of multiple results, the manual approach may be configured to reduce the likelihood of unpredictable behavior that lead to security risks.

Additionally or alternatively, any suitable mechanism for preventing malicious attack using spoofing may be used during the approval process, such as SpoofGuard from VMware Inc. or similar, etc. Such anti-spoofing mechanism may be used to verify and approve an IP address found by a search, such as to ensure that the IP address has not been updated without proper change control review or used by a rouge virtual machine. In practice, the anti-spoofing mechanism may rely on a table of (VNIC ID, IP address) mapping information that is learned based on the TOFU principle, etc. If a particular IP address in the table is later updated, communication to and/or from the updated IP address will be blocked.

Firewall Rules Associated with Rich Objects

Figure 6:
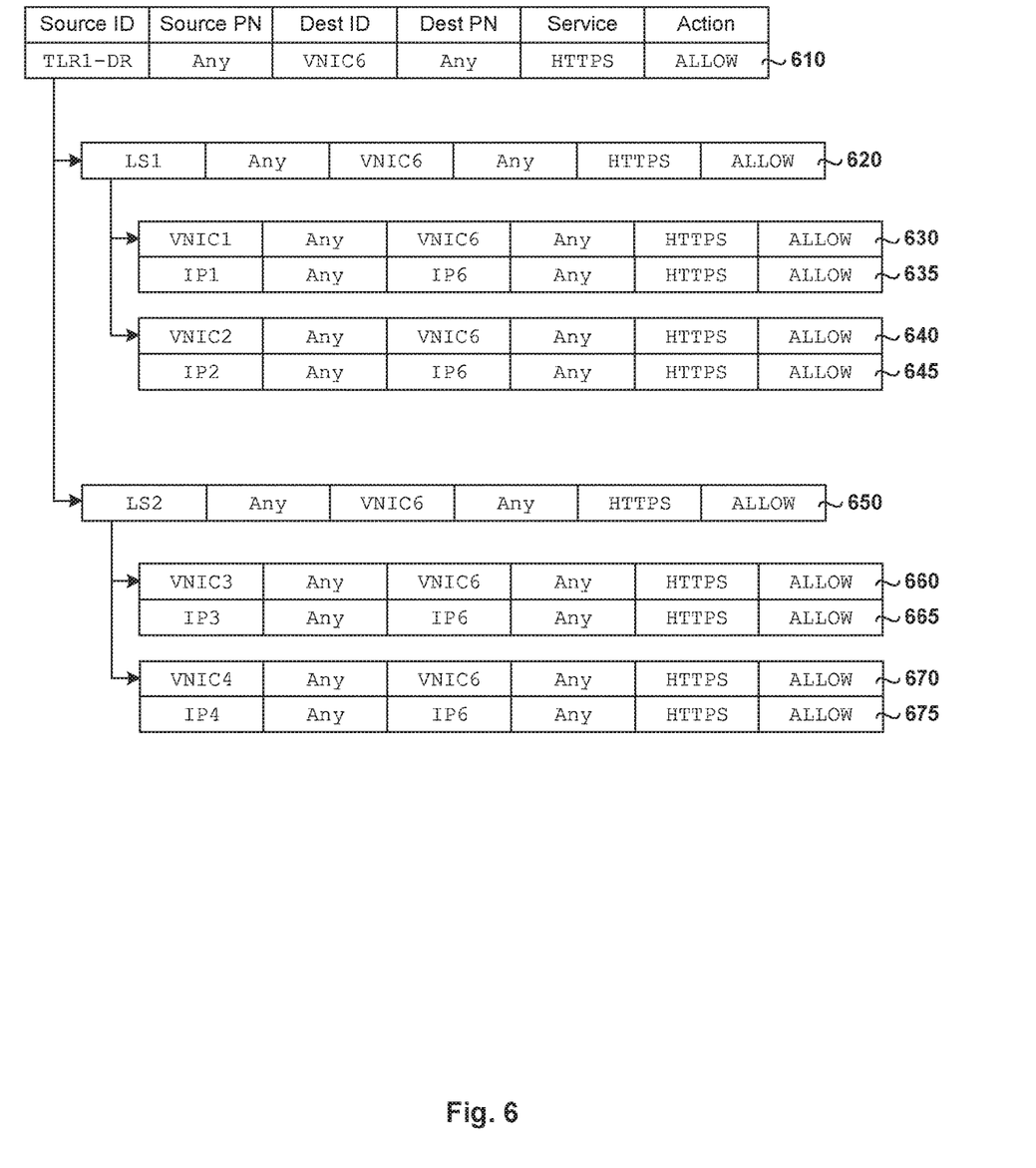
FIG. 6 is a schematic diagram illustrating example object-based firewall rules configured for the logical overlay network in FIG. 3.

Examples of the present disclosure may be used to support rich objects in the source and destination fields of firewall rules. Once IP addresses are translated, their respective identifiers may be utilized in object-based firewall rules for distributed firewall configuration and enforcement. Some examples are shown in FIG. 6, which is a schematic diagram illustrating example object-based firewall rules configured for logical overlay network 300 in FIG. 3. Firewall rule 610 is defined with (source ID=TLR1-DR, source PN=any, destination ID=VNIC6, destination PN=any, service=HTTPS).

To configure firewall rule 610, the virtual machines associated with source ID=TLR1-DR (i.e., an ID of lower-tier TLR1-DR 311) may be identified, such as based on network topology information specifying how TLR1-DR 311 is connected to the virtual machines. In the example in FIG. 3, TLR1-DR 311 is connected to logical switches LS1 301 and LS2 302. As such, firewall rule 610 may be converted to two firewall rules 620, 650 associated with LS1 301 and LS2 302 respectively.

(a) First firewall rule 620 associated with LS1 301 is defined using source ID=LS1. Since LS1 301 is connected to VM1 131 via VNIC1 141 and VM2 132 via VNIC2 142, a further conversion creates two firewall rules associated with respective source ID=VNIC1 (see 630) and VNIC2 (see 640). Based on (VNIC1, IP1), distributed firewall engine 119A at host-A 110A may be configured to implement IP-based firewall rule 635 with source IP=IP1 for packets detected via VNIC1 141. Similarly, based on (VNIC2, IP2), distributed firewall engine 119B at host-B 110B may be configured to implement firewall rule 645 with source IP=IP2 for packets detected via VNIC2 142.

(a) Second firewall rule 650 associated with LS2 302 is defined using source ID=LS1. Since LS2 302 is connected to VM3 133 via VNIC3 143 and VM4 134 via VNIC4 144, a further conversion creates two firewall rules associated with respective source ID=VNIC3 (see 660) and VNIC4 (see 670). Based on (VNIC3, IP3), distributed firewall engine 119B at host-B 110B may be configured to implement IP-based firewall rule 665 with source IP=IP3 for packets detected via VNIC3 143. Based on (VNIC4, IP4), distributed firewall engine 119C at host-C 110C may be configured to implement firewall rule 675 with source IP=IP4 for packets detected via VNIC4 144.

In practice, object-based firewall rules may be configured using SDN manager 150 using any suitable interface (e.g., command line interface, graphical user interface, etc.). Any other suitable "object" or "rich object" (also known as a container object) may be used in the source/destination field, such as a data center with multiple hosts, a cluster of hosts within the data center (e.g., storage cluster, compute cluster, etc.), a particular host, a particular virtual machine supported by the host, a logical overlay network, a logical switch, a logical router, a security group formed by multiple virtual machines, etc. Traffic flow information may be collected in response to the invocation of IP-based firewall rules (e.g., 635, 645, 655, 665) associated with object-based firewall rules (e.g., 610, 620, 630, 640, 650, 660, 670) and used to understand which object is communicating with which object in logical overlay network 300 in FIG. 3. For example, a visualization of various traffic flows from one object to another object may be generated and presented to a user.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical network interface controller(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, the computer system may implement processes performed by SDN manager 150, SDN controller 160, host 110A/110B/110C, etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

I claim:

1. A method to perform network-address-to-identifier translation in a virtualized computing environment that includes a first virtualized computing instance and a second virtualized computing instance, the method comprising:
based on traffic flow information associated with a first network address and a second network address, determining that the first network address is associated with a first identifier that identifies the first virtualized computing instance, wherein the traffic flow information is obtained in response to invocation of a first firewall rule that specifies source information associated with the first network address and destination information associated with the second network address;
obtaining network topology information that specifies how the first virtualized computing instance is connected to the second virtualized computing instance via one or more logical forwarding elements;
based on the network topology information, determining that the second network address is associated with a second identifier that identifies the second virtualized computing instance; and utilizing the first identifier and the second identifier in a second firewall rule to allow or deny a traffic flow between the first virtualized computing instance and the second virtualized computing instance, or to monitor the traffic flow, or both, wherein the second firewall rule with the first identifier and the second identifier utilized therein is translated from the first firewall rule that specifies the source information associated with the first network address and the destination information associated with the second network address.

2. The method of claim 1, wherein determining that the first network address is associated with the first identifier comprises:
   determining an identifier, being the first identifier, of a first virtual network interface controller (VNIC) associated with the first virtualized computing instance.

3. The method of claim 2, wherein determining that the first network address is associated with the first identifier comprises:
   determining the first identifier based on the traffic flow information that is collected by a host supporting the first virtualized computing instance in response to the invocation of the first firewall rule, which is an address-based firewall rule, on packets detected via the first VNIC.

4. The method of claim 1, wherein determining that the second network address is associated with the second identifier comprises:
   determining an identifier, being the second identifier, of a second virtual network interface controller (VNIC) associated with the second virtualized computing instance.

5. The method of claim 1, wherein determining that the second network address is associated with the second identifier comprises one or more of:
   based on the network topology information that specifies how the first virtualized computing instance is connected to the second virtualized computing instance via one or more logical switches, determining whether the first virtualized computing instance and the second virtualized computing instance are connected to a particular logical switch from the one or more logical switches; and
   based on the network topology information that specifies how the first virtualized computing instance is connected to the second virtualized computing instance via one or more logical routers, determining whether the first virtualized computing instance and the second virtualized computing instance are connected to a particular logical router from the one or more logical routers.

6. The method of claim 1, wherein determining that the second network address is associated with the second identifier comprises:
   based on the network topology information that also specifies how the first virtualized computing instance is connected to a third virtualized computing instance, determining that the second network address is also associated with a third identifier that identifies the third virtualized computing instance; and
   selecting the second identifier to be associated with the second network address based on one or more selection criteria, or a user's input, or both.

7. The method of claim 1, wherein utilizing the first identifier and the second identifier comprises one or more of:
   generating the second firewall rule, being an object-based firewall rule, by respectively translating the source information associated with the first network address and the destination information associated with the second network address that are specified in the first firewall rule, which is an address-based firewall rule, to the first identifier and second identifier; and
   generating a visualization of the traffic flow using the first identifier and the second identifier to monitor the traffic flow.

8. A non-transitory computer-readable storage medium that includes a set of instructions which, in response to execution by a processor of a computer system, cause the processor to implement a method of network-address-to-identifier translation in a virtualized computing environment that includes a first virtualized computing instance and a second virtualized computing instance, wherein the method comprises:
   based on traffic flow information associated with a first network address and a second network address, determining that the first network address is associated with a first identifier that identifies the first virtualized computing instance, wherein the traffic flow information is obtained in response to invocation of a first firewall rule that specifies source information associated with the first network address and destination information associated with the second network address;
   obtaining network topology information that specifies how the first virtualized computing instance is connected to the second virtualized computing instance via one or more logical forwarding elements;
   based on the network topology information, determining that the second network address is associated with a second identifier that identifies the second virtualized computing instance; and
   utilizing the first identifier and the second identifier in a second firewall rule to allow or deny a traffic flow between the first virtualized computing instance and the second virtualized computing instance, or to monitor the traffic flow, or both, wherein the second firewall rule with the first identifier and the second identifier utilized therein is translated from the first firewall rule that specifies the source information associated with the first network address and the destination information associated with the second network address.

9. The non-transitory computer-readable storage medium of claim 8, wherein determining that the first network address is associated with the first identifier comprises:
   determining an identifier, being the first identifier, of a first virtual network interface controller (VNIC) associated with the first virtualized computing instance.

10. The non-transitory computer-readable storage medium of claim 9, wherein determining that the first network address is associated with the first identifier comprises:
    determining the first identifier based on the traffic flow information that is collected by a host supporting the first virtualized computing instance in response to invoking the invocation of the first firewall rule, which is an address-based firewall rule, on packets detected via the first VNIC.

11. The non-transitory computer-readable storage medium of claim 8, wherein determining that the second network address is associated with the second identifier comprises:

determining an identifier, being the second identifier, of a second virtual network interface controller (VNIC) associated with the second virtualized computing instance.

12. The non-transitory computer-readable storage medium of claim 8, wherein determining that the second network address is associated with the second identifier comprises one or more of:
    based on the network topology information that specifies how the first virtualized computing instance is connected to the second virtualized computing instance via one or more logical switches, determining whether the first virtualized computing instance and the second virtualized computing instance are connected to a particular logical switch from the one or more logical switches; and
    based on the network topology information that specifies how the first virtualized computing instance is connected to the second virtualized computing instance via one or more logical routers, determining whether the first virtualized computing instance and the second virtualized computing instance are connected to a particular logical router from the one or more logical routers.

13. The non-transitory computer-readable storage medium of claim 8, wherein determining that the second network address is associated with the second identifier comprises:
    based on the network topology information that also specifies how the first virtualized computing instance is connected to a third virtualized computing instance, determining that the second network address is also associated with a third identifier that identifies the third virtualized computing instance; and
    selecting the second identifier to be associated with the second network address based on one or more selection criteria, or a user's input, or both.

14. The non-transitory computer-readable storage medium of claim 8, wherein utilizing the first identifier and the second identifier comprises one or more of:
    generating the second firewall rule, being an object-based firewall rule, by respectively translating the source information associated with the first network address and the destination information associated with the second network address that are specified in the first firewall rule, which is an address-based firewall rule, to the first identifier and second identifier; and
    generating a visualization of the traffic flow using the first identifier and the second identifier to monitor the traffic flow.

15. A computer system configured to perform network-address-to-identifier translation in a virtualized computing environment that includes a first virtualized computing instance and a second virtualized computing instance, the computer system comprising:
    a processor; and
    a non-transitory computer-readable medium having stored thereon instructions that, in response to execution by the processor, cause the processor to:
        based on traffic flow information associated with a first network address and a second network address, determine that the first network address is associated with a first identifier that identifies the first virtualized computing instance, wherein the traffic flow information is obtained in response to invocation of a first firewall rule that specifies source information associated with the first network address and destination information associated with the second network address;
        obtain network topology information that specifies how the first virtualized computing instance is connected to the second virtualized computing instance via one or more logical forwarding elements;
        based on the network topology information, determine that the second network address is associated with a second identifier that identifies the second virtualized computing instance; and
        utilize the first identifier and the second identifier in a second firewall rule to allow or deny a traffic flow between the first virtualized computing instance and the second virtualized computing instance, or to monitor the traffic flow, or both, wherein the second firewall rule with the first identifier and the second identifier utilized therein is translated from the first firewall rule that specifies the source information associated with the first network address and the destination information associated with the second network address.

16. The computer system of claim 15, wherein the instructions that cause the processor to determine that the first network address is associated with the first identifier cause the processor to:
    determine an identifier, being the first identifier, of a first virtual network interface controller (VNIC) associated with the first virtualized computing instance.

17. The computer system of claim 16, wherein the instructions that cause the processor to determine that the first network address is associated with the first identifier cause the processor to:
    determine the first identifier based on the traffic flow information that is collected by a host supporting the first virtualized computing instance in response to invoking the invocation of the first firewall rule, which is an address-based firewall rule, on packets detected via the first VNIC.

18. The computer system of claim 15, wherein the instructions that cause the processor to determine that the second network address is associated with the second identifier cause the processor to:
    determine an identifier, being the second identifier, of a second virtual network interface controller (VNIC) associated with the second virtualized computing instance.

19. The computer system of claim 15, wherein the instructions that cause the processor to determine that the second network address is associated with the second identifier cause the processor to perform one or more of:
    based on the network topology information that specifies how the first virtualized computing instance is connected to the second virtualized computing instance via one or more logical switches, determine whether the first virtualized computing instance and the second virtualized computing instance are connected to a particular logical switch from the one or more logical switches; and
    based on the network topology information that specifies how the first virtualized computing instance is connected to the second virtualized computing instance via one or more logical routers, determine whether the first virtualized computing instance and the second virtualized computing instance are connected to a particular logical router from the one or more logical routers.

20. The computer system of claim 15, wherein the instructions that cause the processor to determine that the second network address is associated with the second identifier cause the processor to:
- based on the network topology information that also specifies how the first virtualized computing instance is connected to a third virtualized computing instance, determine that the second network address is also associated with a third identifier that identifies the third virtualized computing instance; and
- select the second identifier to be associated with the second network address based on one or more selection criteria, or a user's input, or both.

21. The computer system of claim 15, wherein the instructions that cause the processor to utilize the first identifier and the second identifier cause the processor to perform one or more of:
- generate the second firewall rule, being an object-based firewall rule, by respectively translating the source information associated with the first network address and the destination information associated with the second network address that are specified in the first firewall rule, which is an address-based firewall rule, to the respective first identifier and second identifier; and
- generate a visualization of the traffic flow using the first identifier and the second identifier to monitor the traffic flow.

* * * * *